May 29, 1973

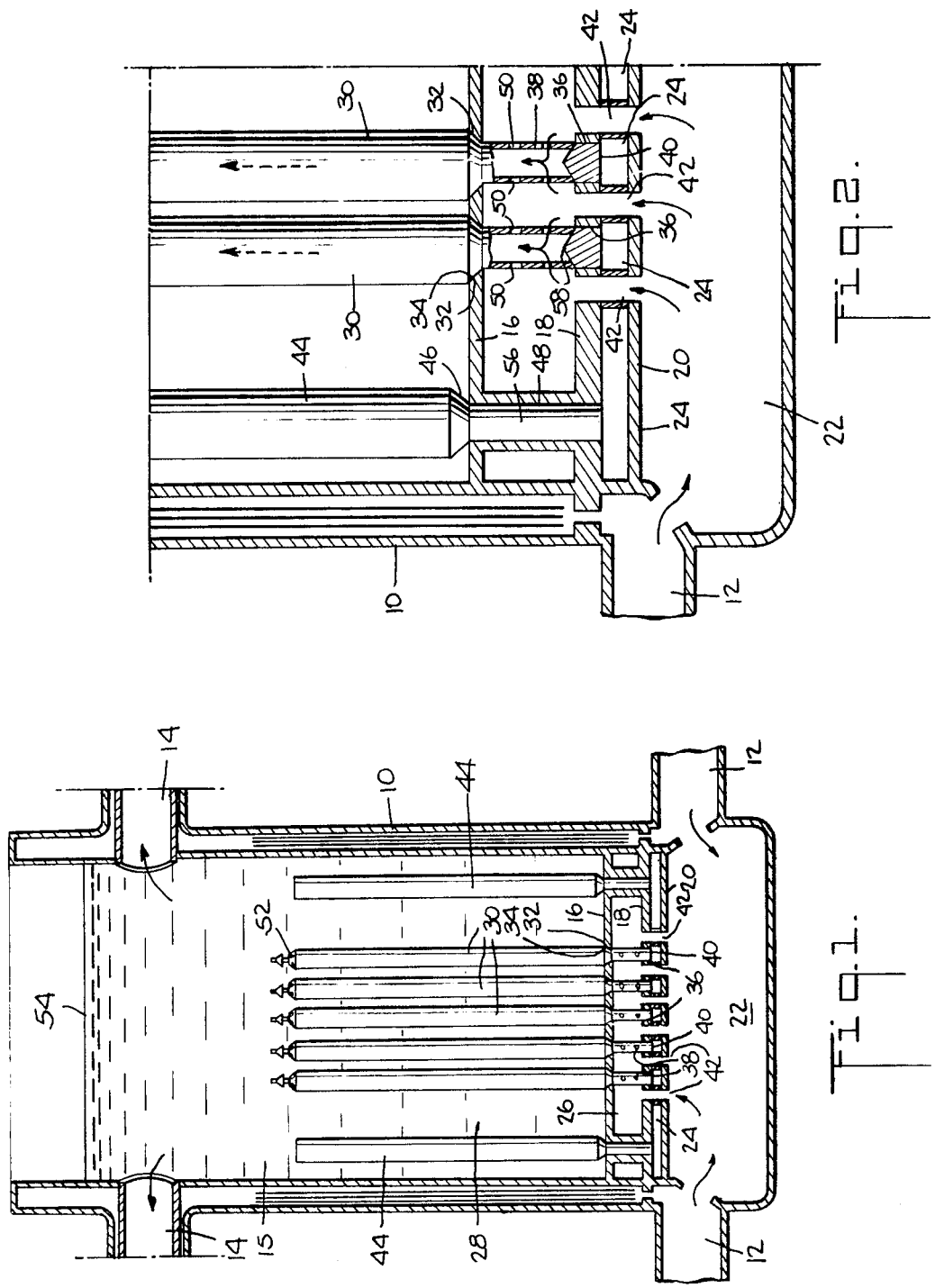

NAOKI SAKURAMA
HOLD-DOWN ARRANGEMENT FOR NUCLEAR
REACTOR FUEL SUBASSEMBLIES 3,736,226

Filed Nov. 6, 1970

INVENTOR.
NAOKI SAKURAMA

BY
Ward McEllennon Brooks & Fitzpatrick
ATTORNEYS

United States Patent Office 3,736,226
Patented May 29, 1973

3,736,226
HOLD-DOWN ARRANGEMENT FOR NUCLEAR REACTOR FUEL SUBASSEMBLIES
Naoki Sakurama, Hitachi, Japan, assignor to Atomic Power Development Associates, Inc., Detroit, Mich.
Filed Nov. 6, 1970, Ser. No. 87,432
Int. Cl. G21c 15/00
U.S. Cl. 176—50                         7 Claims

ABSTRACT OF THE DISCLOSURE

This invention relates to means for retaining a nuclear fuel subassembly in position on support means by using hydraulic pressure. The support means divides the reactor vessel into four plenums by means of three support plates disposed one above the other. The fuel subassemblies are mounted on the top support plate and have portions which project through the second plate and are exposed to the pressure conditions of the lower medial plenum. Communication means interconnect the upper plenum with the lower medial plenum at substantially the same relatively low pressure while communication means interconnect the lower plenum and the upper medial plenum to maintain them both at substantially the same relatively high pressure. Inlets for the fuel subassemblies are disposed in the upper medial plenum and outlets from the fuel subassemblies are in the upper plenum.

---

This invention relates to nuclear reactors, and more particularly to hydraulic hold-down means for nuclear reactor fuel assemblies.

In a nuclear reactor it is customary for the reactor core to be provided with a plurality of vertically disposed fuel assemblies supported on a plate. The lower end of each fuel assembly has an inlet nozzle for receiving fluid coolant such as sodium from a high pressure plenum. The coolant acts as a heat exchange medium and is under pressure so that it passes vertically upwardly through each fuel assembly where it picks up heat energy. Then it is discharged from the top of the fuel assembly into a low pressure plenum from which it is directed to an external heat exchange system for driving a prime mover, such as a steam turbine, for example.

The upward flow of the liquid coolant through the fuel subassemblies exerts a drag thereon which, together with the outside pressure forces and the buoyancy of the subassembly in the liquid coolant, creates a lifting force which is greater than the weight of the subassembly. Since these fuel elements must be periodically removed from the reactor for reprocessing or replacement, they cannot be permanently affixed to the support plate structure. Various hydraulic means have been used for holding down the fuel subassemblies, but they have not been entirely satisfactory. In some instances, the upward flow of the cooling fluid tended to have non-uniform flow distribution. There tended to be a loss of hold-down force due to local blockage in the connection with one continuous low pressure plenum. Difficulties were encountered in providing a flow guard against foreign objects entering the system.

I have conceived by my invention an effective solution to the problems presented through a construction that is efficient and yet relatively simple, as will become apparent as the description proceeds.

In essence, I contribute by my invention a new and improved nucluear reactor including a reactor vessel having a lower inlet leading to a lower plenum and an upper outlet leading from an upper plenum. Support plate means are provided which partition the vessel into the lower plenum, a lower medial plenum, an upper medial plenum and the upper plenum. A series of tube encased fuel subassemblies are removably supported in upstanding relationship on the support plate means and the flow of liquid coolant is directed upwardly therethrough. Each of the fuel assemblies has a lower end portion which is exposed to the pressure conditions of the lower medial plenum, and flow channel means are provided for interconnecting the lower medial plenum to said upper plenum in fluid flow communication without substantial pressure loss. In addition, conduit means are provided for interconnecting the lower plenum with the upper medial plenum in fluid flow communication without substantial pressure loss. Inlets for the fuel subassemblies are disposed in the upper medial plenum and outlets therefrom are in the upper plenum.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings, forming a part of the specification, wherein:

FIG. 1 is a vertical, medial, sectional view of a nuclear reactor constructed according to the concept of my invention;

FIG. 2 is an enlarged, fragmentary, vertical, sectional view showing details of the supporting structure and hold-down means for the fuel subassemblies.

Figure 3:
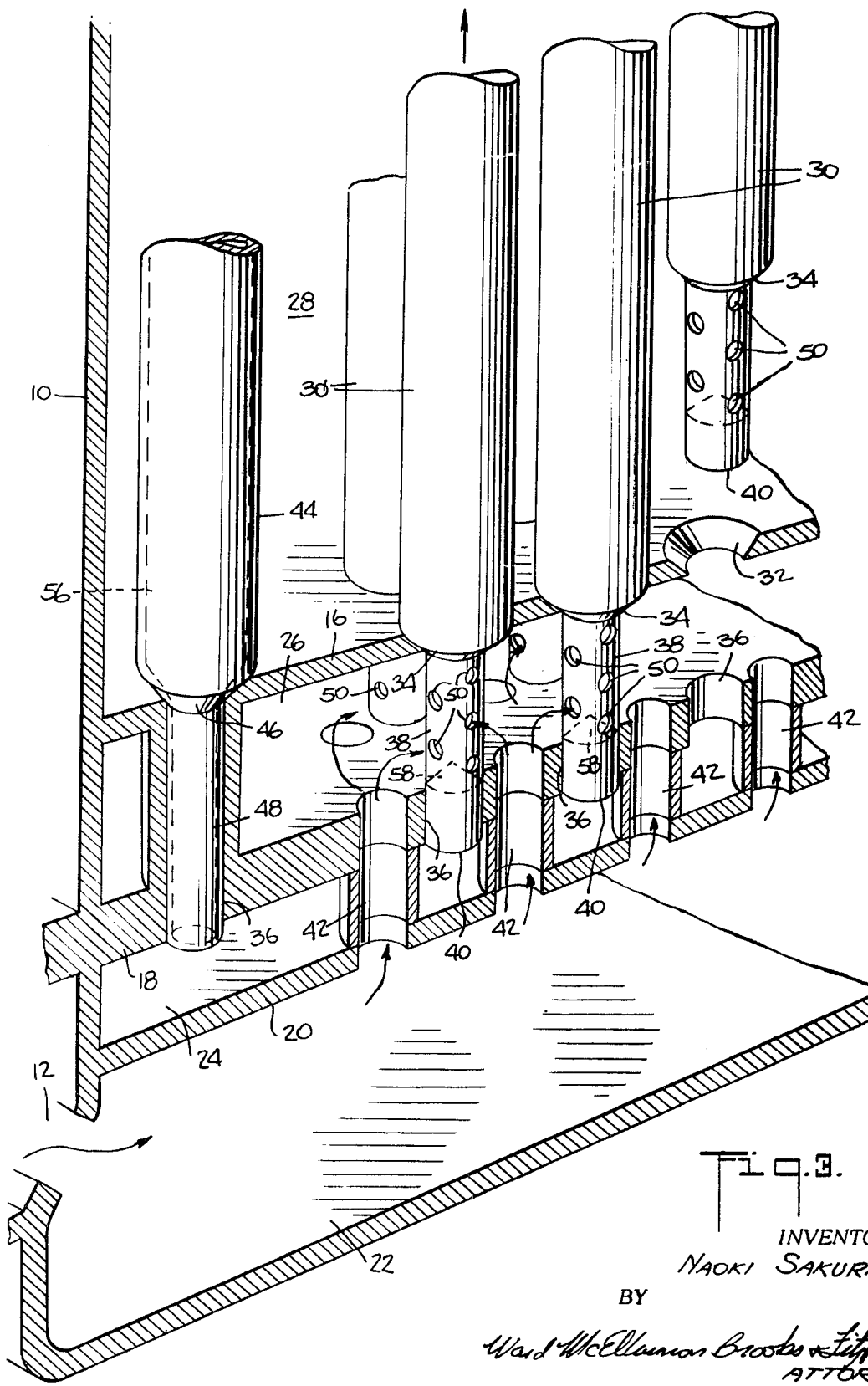
FIG. 3 is an enlarged perspective view of the supporting structure and hold-down means for the fuel subassemblies of FIGS. 1 and 2.

The embodiment of the invention illustrated comprises a reactor vessel 10 having a series of lower inlets 12 and a series of upper outlets 14 for circulating liquid coolant 15, such as sodium, upwardly therethrough. Support plate means extend across the vessel above the inlets 12. They comprise a first upper support plate 16, a second medial support plate 18 and a third lower support plate 20. These support plates span the reactor vessel and partition same into a lower plenum 22, a lower medial plenum 24, an upper medial plenum 26, and an upper plenum 28. The lower plenum 22 connects with the inlets 12 and the upper plenum 28 connects with the outlets 14.

A series of tube encased fuel subassemblies 30 are removably supported in upstanding relationship on the support means. The first upper support plate 16 has a plurality of circular openings 32 therethrough. Each opening may have a bevelled edge and each of said fuel subassemblies has a mating shoulder 34, which may also be bevelled. The second medial support plate 18 has a plurality of openings 36 disposed below and in alignment with the openings 32 in the first plate. Each of the fuel assemblies 30 has a lower end portion or projection 38 which fits into its corresponding opening in said second medial plate 18 with a relatively close fit. Each of the lower end portions 38 has a bottom face 40 which is exposed to the pressure conditions of the lower medial plenum 24.

As best seen in FIGS. 2 and 3, a plurality of conduits 42 interconnect the lower plenum 22 with the upper medial plenum 26 in fluid flow communication. These conduits are of sufficient cross sectional area that both plenums are at substantially the same pressure.

A plurality of dummy assemblies 44 are mounted on the support means in a manner similar to that of the subassemblies 30. That is, each of the dummy assemblies has a mating shoulder 46, which may be bevelled, for engaging the edges, which may be bevelled, of the openings 32. Also, each of the dummy assemblies has a lower end portion 48 which fits into the corresponding opening 36 in the second medial plate 18 with a relatively close fit. The dummy assemblies have large inner passages 56, FIG. 3, so that there is substantially no pressure drop of the sodium passing therethrough and hence the lower medial plenum 24 is at substantially the same pressure as the upper plenum 28.

In operation sodium enters the lower plenum 22 through the inlets 12 and passes upwardly through the conduits 42 to the upper medial plenum 26. Thereafter, the sodium enters the fuel assembly 30 through openings 50. Each of the fuel assemblies is adapted to contain a series of fuel elements consisting of pins or slugs of material useful in carrying out a nuclear chain reaction, and may constitute either a core or blanket of the reactor or both. The sodium coolant is circulated upwardly through the fuel subassembly for removing heat from the reaction. Then, the sodium passes into the upper plenum 28 through openings 52 at the top of the fuel assemblies. The sodium rises to a level, such as indicated at 54, FIG. 1, within the upper plenum 28, and thence it is dicharged through the outlets 14. Sodium leaking past the lower end of the fuel assemblies 30 passes into the lower medial plenum 24, and thence upwardly through the dummy assemblies 44 to the upper plenum 28. Therefore, as pointed out hereinbefore, the lower plenum 22 and the upper medial plenum 26 are at substantially the same relatively high pressure and, also, the upper plenum 28 and the lower medial plenum 24 are at the same relatively lower pressure.

During normal operation the lifting forces exerted on the fuel subassembly include the buoyancy of the subassemblies in the path of the liquid sodium coolant, the drag exerted on the subassembly by the upward flow of sodium therethrough and the pressure forces acting on the surfaces thereof. Due to the coolant flow velocity required, the total lifting forces may exceed the weight of the subassembly and, hence, means are needed to hold the subassembly down in place. According to this invention I have discovered hydraulic means which serve to hold down the fuel subassemblies. As pointed out hereinbefore the bottom face 40 of the fuel assembly is subjected to the pressure contained in the lower medial plenum 24, and therefore the upper end and the lower end of the fuel subassemblies are both subjected to the same relatively low pressure of the upper plenum 28 and the lower medial plenum 24. Hence, they balance each other. The high pressure sodium holds the fuel subassembly down by acting downwardly on the internal face 58 of the lower end portion 38. In addition, the turning force of the sodium as it passes horizontally through the openings 50, and thence vertically upwardly through internal passages within the assembly, also assists in holding down the assembly. Accordingly, the above hydraulic forces in conjunction with the force of gravity serve to hold down the fuel assembly.

It will thus be seen that the present invention does indeed provide an improved hydraulic hold-down means for use with a fuel subassembly in a nuclear reactor which is superior in simplicity and economy as compared to prior art such devices. In addition, gross blockage of individual fuel subassemblies by large objects entering the lower plenum is prevented.

Although a particular embodiment of the invention is herein disclosed for purposes of explanation, various modifications thereof, after study of this specification, will be apparent to those skilled in the art to which the invention pertains.

What is claimed and desired to be secured by Letters Patent is:

1. A nuclear reactor comprising a reactor vessel having a lower inlet and an upper outlet for circulating liquid coolant upwardly therethrough, support plate means partitioning said vessel into a lower plenum, a lower medial plenum, an upper medial plenum and an upper plenum, said lower plenum communicating with said inlet and said upper plenum communicating with said outlet, a series of tube-encased fuel subassemblies removably supported in upstanding relationship on said support plate means, means for directing the flow of said liquid coolant upwardly through said subassemblies, inlet means for said fuel subassemblies being disposed in said upper medial plenum and outlet mean for said subassemblies being disposed in said upper plenum, each of said fuel assemblies having a lower end portion exposed to the pressure conditions of said lower medial plenum, conduit means interconnecting said lower plenum with said upper medial plenum in fluid flow communication without substantial pressure loss and flow channel means for interconnecting said lower medial plenum to said upper plenum in fluid flow communication without substantial pressure loss.

2. A nuclear reactor according to claim 1 wherein said plate means comprises a first upper support plate, a second medial support plate and a third lower support plate, said plates spanning said vessel and partitioning same into said plenums.

3. A nuclear reactor according to claim 2 wherein said first support plate has a plurality of circular openings therethrough, each opening having an edge portion and each of said fuel subassemblies having a mating shoulder, said second medial support plate having a plurality of openings disposed below the opening and in alignment with the openings in said first upper plate respectively, each of said fuel assemblies having an end portion which extends into its corresponding opening in said second medial plate.

4. A nuclear reactor according to claim 1, wherein said conduit means interconnecting said lower plenum with the upper plenum in fluid flow communication is a plurality of dummy assemblies mounted on said support plate means and having flow channel means therein.

5. A nuclear reactor according to claim 1 wherein said means for directing the flow of said liquid coolant upwardly through said subassembly comprises horizontally disposed inlet openings so that the liquid coolant flows horizontally into the subassembly and thence vertically upwardly therethrough.

6. A nuclear reactor comprising a reactor vessel having a lower inlet and an upper outlet for circulating liquid coolant upwardly therethrough, support plate means comprising a first upper support plate, a second medial support plate and a third lower support plate, said plates spanning said vessel and partitioning same into a lower plenum, a lower medial plenum, an upper medial plenum and an upper plenum, said lower plenum communicating with said inlet and said upper plenum communicating with said outlet, a series of tube-encased fuel subassemblies removably supported in upstanding relationship on said support plate means, means for directing the flow of said liquid coolant upwardly through said subassemblies, inlet means for said fuel subassemblies being disposed in said upper medial plenum and outlet means for said subassemblies being disposed in said upper plenum, said first upper support plate having a plurality of circular openings therethrough, each opening having an edge portion and each of said fuel subassemblies having a mating shoulder respectively, said second medial support plate having a plurality of openings disposed below and in alignment with the openings in said first upper plate respectively, each of said fuel subassemblies having an end portion which fits into its corresponding opening in said second medial plate, said end portions having bottom faces exposed to the pressure conditions of said lower medial plenum, conduit means interconnecting said lower plenum with said upper medial plenum in fluid flow communication without substantial pressure loss, a plurality of dummy assemblies having mating shoulders for engaging said edge portions on said first upper support plate and having an end portion extending into its corresponding opening in said second medial plate, said dummy assemblies having flow channel means for interconnecting said lower medial plenum to said upper plenum in fluid flow communication without substantial pressure loss.

7. A nuclear reactor comprising a reactor vessel having a lower inlet and an upper outlet for circulating liquid coolant upwardly therethrough, support plate means comprising a first upper support plate, a second medial support plate and a third lower support plate, said plates spanning said vessel and partitioning same into a lower plenum, a lower medial plenum, an upper medial plenum and an upper plenum, said lower plenum communicating with said inlet and said upper plenum communicating with said outlet, a series of tube-encased fuel subassemblies removably supported in upstanding relationship on said support plate means, each of said fuel subassemblies having a plurality of horizontally disposed inlet openings disposed in said upper medial plenum and vertically upwardly directed channels for the flow of liquid therethrough, outlet means for said subassemblies being disposed in said upper plenum, said first upper support plate having a plurality of circular openings therethrough, each opening having an edge portion and each of said fuel subassemblies having a mating shoulder respectively, said second medial support plate having a plurality of openings disposed below and in alignment with the openings in said first upper plate respectively, each of said fuel subassemblies having an end portion which fits into its corresponding opening in said second medial plate, said end portions having bottom faces exposed to the pressure conditions of said lower medial plenum, conduit means interconnecting said lower plenum with said upper medial plenum in fluid flow communication without substantial pressure loss, a plurality of dummy assemblies having mating shoulders for engaging said edge portions on said first upper support plate and having an end portion extending into its corresponding opening in said second medial plate, said dummy assemblies having flow channel means for interconnecting said lower medial plenum to said upper plenum in fluid flow communication without substantial pressure loss.

References Cited
UNITED STATES PATENTS

| | | | |
|---|---|---|---|
| 3,350,277 | 10/1967 | Costes | 176—87 |
| 3,549,493 | 12/1970 | Germer | 176—61 |
| 3,235,465 | 2/1966 | McDaniel et al. | 176—61 |

CARL D. QUARFORTH, Primary Examiner

H. E. BEHREND, Assistant Examiner

U.S. Cl. X.R.

176—61